United States Patent
Bouis et al.

(10) Patent No.: US 6,798,880 B1
(45) Date of Patent: *Sep. 28, 2004

(54) SYSTEM AND METHOD FOR SUPPRESSING IN-BAND STIMULI AND TELECOMMUNICATIONS INFRASTRUCTURE INCORPORATING THE SAME

(75) Inventors: Jeffrey D. Bouis, Frisco, TX (US); Michael P. Dimitroff, Plano, TX (US); Alan T. Huch, Addison, TX (US); Gregory M. Vaudreuil, Dallas, TX (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 114 days.

(21) Appl. No.: 09/262,235

(22) Filed: Mar. 4, 1999

(51) Int. Cl.[7] .......................... H04M 3/00; H04M 15/06
(52) U.S. Cl. .................................. 379/386; 379/142.01
(58) Field of Search .............................. 379/386, 93.35, 379/215.01, 142.01

(56) References Cited

U.S. PATENT DOCUMENTS 5,604,793 A * 2/1997 Chitrapu et al. ......... 379/88.09
6,381,330 B1 * 4/2002 Johanson ..................... 379/386

OTHER PUBLICATIONS

Internet Engineering Task Force, "RTP Payloads for Telephone Signal Events," Internet Web Site http://search.ietf.org/internet-drafts/draft-ietf-avt-telephone-tones-oo.txt, Nov. 17, 1998, 11 pages.

Internet Engineering Task Force, "RTP Payload for DTMF Digits," Internet Web Site http://search.ietf.org/internet--drafts/draft-ietf-avt-dtmf-01.txt, Nov. 18, 1998, 6 pages.

* cited by examiner

Primary Examiner—Xu Mei
Assistant Examiner—Jefferey Harold

(57) ABSTRACT

For use with analog telecommunications equipment that responds to in-band stimuli, a system for, and method of suppressing an in-band stimulus and a telecommunications infrastructure employing the system or the method. In one embodiment, the system includes: (1) a stimulus detector, associated with the analog telecommunications equipment, that detects a presence of the in-band stimulus and (2) a stimulus suppressor, coupled to the stimulus detector, that alters the in-band stimulus to cause the analog telecommunications equipment to disregard the in-band stimulus.

21 Claims, 3 Drawing Sheets

SYSTEM AND METHOD FOR SUPPRESSING IN-BAND STIMULI AND TELECOMMUNICATIONS INFRASTRUCTURE INCORPORATING THE SAME

TECHNICAL FIELD OF THE INVENTION

The present invention is directed, in general, to control signal suppression and, more specifically, to a system and method for suppressing in-band stimuli and a telecommunications infrastructure incorporating the system or the method.

BACKGROUND OF THE INVENTION

When the public switched telephone network (PSTN) was first put in place decades ago, it was analog-based and employed in-band pulse-width modulated (PWM) control signals to control telecommunications equipment connected to the PSTN. Soon thereafter, in-band dual tone multifrequency (DTMF) tones came into use to achieve in-band signaling. Dial tones, busy signals and other inter-equipment control signals were created with DTMF tones.

As the years progressed, the PSTN evolved from analog systems to the digital systems that are now in wide use. In today's mostly digital PSTN, almost the entire network is digital, except for most of the telephone lines strung between central offices (COs) and customer premises, which remain analog. User traffic transmitted over the analog telephone line is converted to digital information at the COs. Once the digital information reaches the last CO in line, the digital information is converted back to an analog format.

Today's digital PSTN systems also transmit control signals out-of-band instead of in-band. This prevents a user from hearing any of the control signals while having a conversation. However, telephony line cards and applications still exist that respond to in-band control signals.

Many current computer systems and voice processing applications have the capability to store and transmit user traffic in both digital and analog formats. Problems can occur when speech containing in-band control signals (generated accidentally or intentionally) is transmitted to equipment or systems that respond to in-band control signals. For example, if a message contains concurrent frequencies or silence that a voice mail machine might misinterpret as being in-band control tones, the voice mail machine might fail to deliver the message or modify the message in some undesirable manner.

Accordingly, what is needed in the art is a way to prevent in-band control signals from causing unexpected or unintended results in systems or applications that still recognizes in-band control signals.

SUMMARY OF THE INVENTION

To address the above-discussed deficiencies of the prior art, the present invention provides, for use with analog telecommunications equipment that responds to in-band stimuli, a system for, and method of suppressing an in-band stimulus and a telecommunications infrastructure employing the system or the method. In one embodiment, the system includes: (1) a stimulus detector, associated with the analog telecommunications equipment, that detects a presence of the in-band stimulus and (2) a stimulus suppressor, coupled to the stimulus detector, that alters the in-band stimulus to cause the analog telecommunications equipment to disregard the in-band stimulus.

The present invention therefore introduces the broad concept of suppressing, or disabling, stimuli before analog equipment has an opportunity to act on them. A "stimulus" is defined for purposes of the present invention as an affirmative control signal, such as one or more tones (including DTMF signals) or a period of subthreshold amplitude variation (a period during which the amplitude of the user traffic varies less than a threshold set by the analog telecommunications equipment such that the equipment interprets the period as a period of silence). An "affirmative control signal" can be a command or convey operating status.

In one embodiment of the present invention, the in-band stimulus is a dual tone multifrequency (DTMF) signal and the stimulus suppressor alters the in-band stimulus by altering a tone in the DTMF signal. The stimulus suppressor may attenuate, frequency-shift, truncate, distort or eliminate the tone completely to suppress the DTMF signal as a whole.

In one embodiment of the present invention, the in-band stimulus is a period of subthreshold amplitude variation and the stimulus suppressor increases the amplitude variation during the period. The stimulus suppressor may inject noise into the user traffic or variably amplify the user traffic to increase variation and thereby fool the analog telecommunications equipment into disregarding the period as being a period of silence.

In one embodiment of the present invention, the in-band stimulus is selected from the group consisting of: (1) a dial tone, (2) a busy signal, (3) a ringback signal and (4) an offhook signal. Those skilled in the art will understand, however, that the principles of the present invention are applicable to any type of in-band signaling.

In one embodiment of the present invention, the system is located in the analog telecommunications equipment. In an alternative embodiment of the present invention, the system is located in a conference bridge. The system may alternatively be located in a switch associated with the public switched telephone network (PSTN). The system may, in fact, concurrently exist at many locations.

In one embodiment of the present invention, the system is embodied in a sequence of software instructions. Alternatively, the system of the present invention may be embodied in hardware or firmware, as the particular application may find advantageous.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
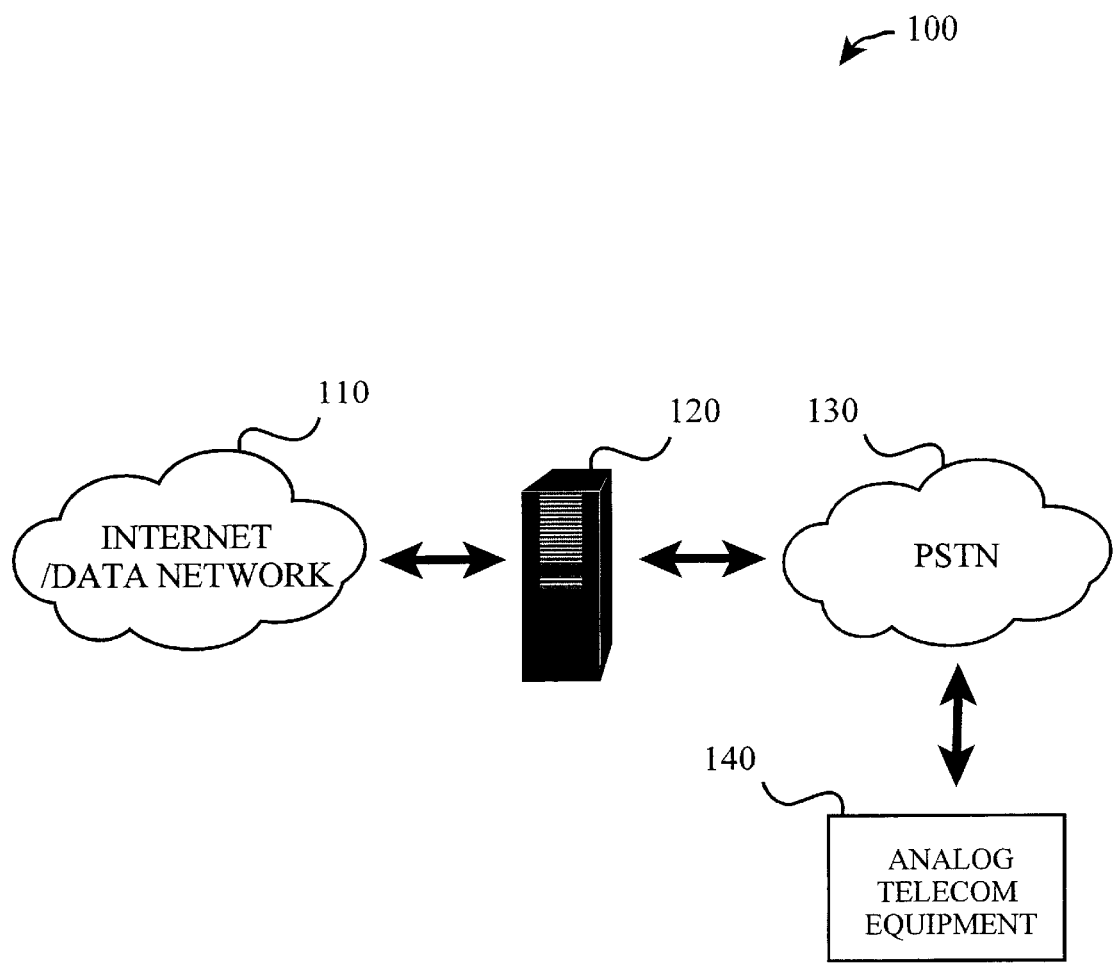
FIG. 1 illustrates a telecommunications infrastructure that may form an environment within which a system or a method constructed or carried out according to the principles of the present invention may be incorporated.

Referring initially to FIG. 1 illustrates a telecommunications infrastructure that may form an environment within which a system or a method constructed or carried out according to the principles of the present invention may be incorporated. In one embodiment of the present invention, the invention comprises an Internet/data network 110, an in-band suppression system 120, a public switched telephone network ("PSTN") and an analog telecommunications equipment 140.

The Internet/data network 110 transmits digitized analog information containing in-band stimuli to the in-band suppression system 120. In one embodiment of the present invention, the in-band stimuli comprise dual tone multifrequency ("DTMF") signals, dial tones, busy signals, ringback signals and offhook signals.

The in-band suppression system 120 monitors the digitized analog information for in-band stimuli. Once an in-band stimulus is detected, the in-band suppression system 120 extracts or alters the in-band stimulus to prevent analog telecommunication systems from acting spuriously on the in-band stimulus. In one embodiment of the present invention, the in-band suppression system 120 may employ additional telecommunication hardware to operate as a telecommunications router or gateway. In another embodiment the in-band suppression system 120 may employ additional hardware to operate as a PSTN switch or a conference bridge.

The in-band suppression system 120 transmits the stimuli suppressed digitized analog information to the PSTN 130. The PSTN 130 may convert the stimuli suppressed digitized analog information back into an analog format. The PSTN 130 may also employ analog telecommunications equipment 140 that require in-band stimuli to be suppressed in order to operate properly. One type of analog telecommunications equipment the may be use is a voice mail system.

One skilled in the art should understand that the present invention is not limited to using the Internet/data network 110. In another embodiment of the present invention, the digitized analog information containing the in-band stimuli is transmitted directly into the in-band suppression system 120. In a third embodiment of the present invention, the digitized analog information containing the in-band stimuli information, that will be processed by the in-band suppression system 120, is contained within a computer system containing the in-band suppression system 120.

Figure 2:
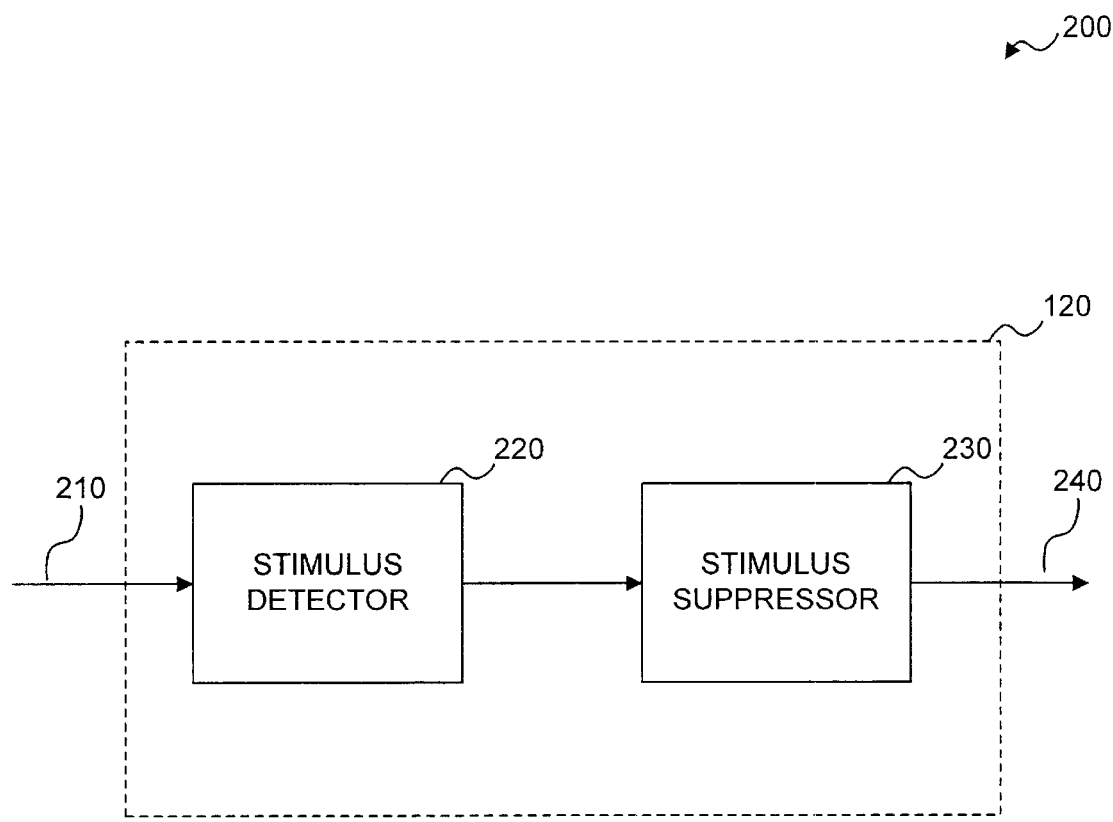
FIG. 2 illustrates a block diagram of a in-band suppression system of FIG. 1 constructed according to the principles of the present invention.

Turning now to FIG. 2, illustrated is a block diagram of an in-band suppression system 120 of FIG. 1 constructed according to the principles of the present invention. The in-band suppression system 120 comprises a stimulus detector 220 and a stimulus suppressor 230. Coupled to the input of the stimulus detector 220 is a stream of digitized analog information 210 that may contain in-band stimuli.

The stimulus detector 220 monitors the stream of digitized analog information 210 for in-band stimuli. Once an in-band stimulus is detected, the stimulus detector 220 informs the stimulus suppressor 230 to suppress the in-band stimulus. In one embodiment of the present invention, the stimulus suppressor 230 will extract the in-band stimulus completely, alter the in-band stimulus, or inject a signal depending upon the type of in-band stimulus present. If the in-band stimulus is a busy signal, dial tone, ringback signal, offhook signal or DTMF tones, the stimulus suppressor 230 will extract or alter the in-band stimulus. If the in-band stimulus is silence, the stimulus suppressor 230 will inject a signal to prevent analog telecommunication equipment from acting on silence.

Once the in-band stimulus has been suppressed, the stimulus suppressor 230 transmits an in-band stimuli suppressed stream of digitized analog information 240 to the PSTN 130. The PSTN 130 may convert the digitized information back into an analog format that is used by analog telecommunications equipment. The in-band suppression system 120 repeats this process as long as in-band suppression system 120 receives data.

Those skilled in the art should note that in-band suppression system 120 may contain additional or fewer features than described above. Also, the stimulus detector 220 and the stimulus suppressor 230 are not limited to detecting and suppressing the types of in-band stimuli described. In other embodiments of the present invention, the stimulus suppressor 230 may perform additional or fewer suppression techniques than described.

Figure 3:
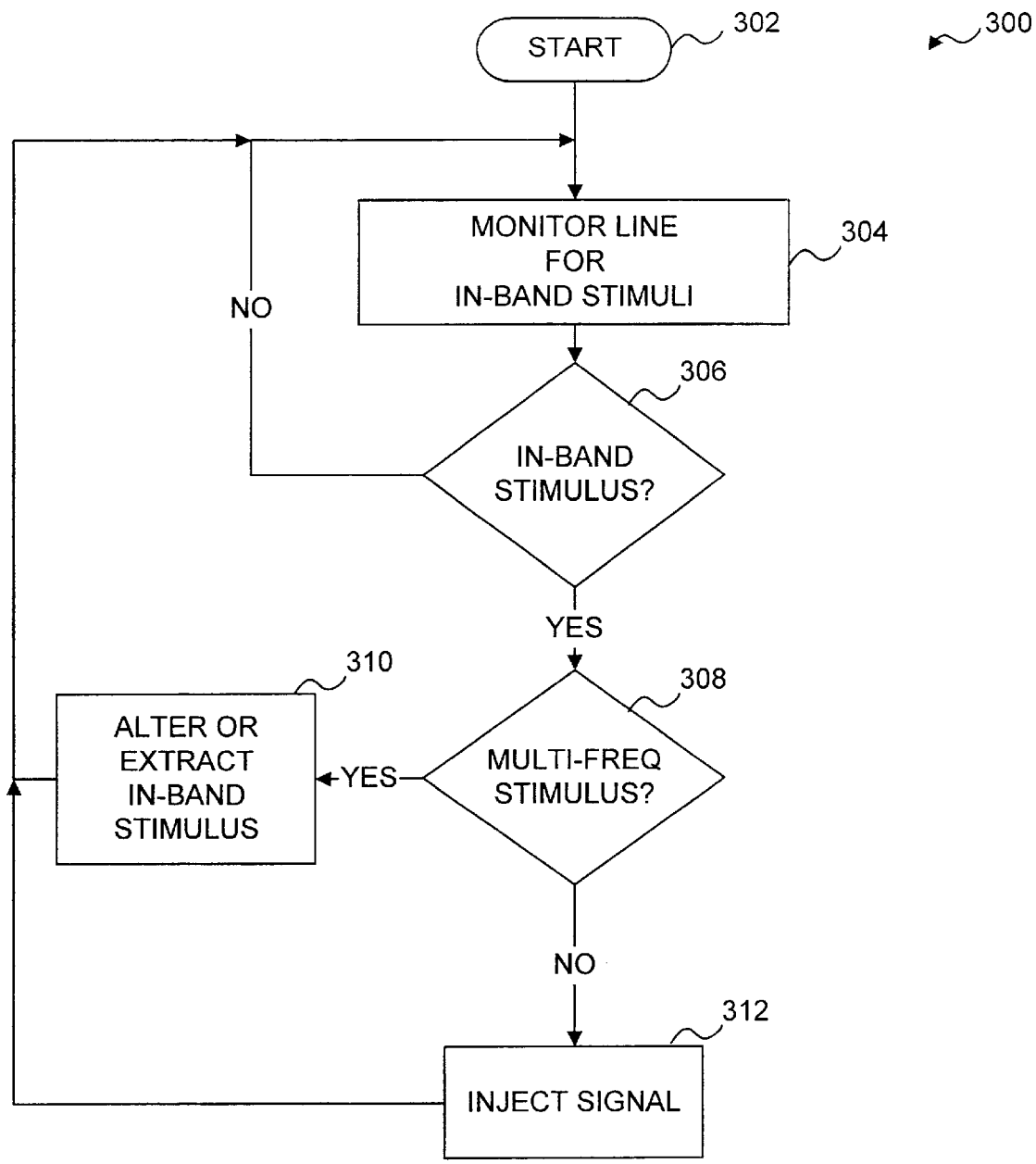
FIG. 3 illustrates a flow diagram of a method for detecting and suppressing in-band stimuli using the in-band suppression system 120 of FIG. 2.

Turning now to FIG. 3, illustrated is a flow diagram of a method for detecting and suppressing in-band stimuli using the in-band suppression system 120 of FIG. 2. In FIG. 3, the in-band suppression system 120 first performs initialization and starts the detection and suppression process in a step 302.

After initialization, the stimulus detector 220 monitors the incoming stream of digitized analog information 210 for in-band stimuli in a step 304. The stimulus detector 220 determines if there is an in-band stimulus present in the stream of digitized analog information 210 in a decisional step 306. If there is no in-band stimulus present, the stimulus detector 220 continues to monitor the incoming stream of digitized analog information 210 for other in-band stimuli in the step 304.

If there is an in-band stimulus present, the stimulus suppressor 230 determines if the in-band stimulus is a multi-frequency stimulus in a decisional step 308. In one embodiment of the present invention, the multi-frequency stimulus comprises a busy signal, a dial tone, a ringback signal, an offhook signal, and DTMF tones.

If the in-band stimulus is a multi-frequency stimulus, the stimulus suppressor alters or extracts the in-band stimulus in a step 310. When the stimulus suppressor 230 alters an in-band stimulus, the stimulus suppressor 230 removes one of the in-band stimulus's frequencies from the incoming stream of digitized analog information. When the stimulus suppressor 230 extracts the in-band stimulus, the stimulus suppressor 230 extracts all of the frequencies that comprise that type of in-band stimulus from the incoming stream of digitized analog information. The stimulus detector 220 then continues to monitor for additional in-band stimuli in the step 304.

If the in-band stimulus is not a multi-frequency stimulus, the stimulus is a period of silence. The stimulus suppressor 230 injects a signal into the incoming stream of digitized analog information to prevent analog telecommunications equipment from acting on this period of silence in a step 312. The in-band suppression system 120 continues to monitor the incoming stream of digitized analog information 210 for additional in-band stimuli in the step 304.

One skilled in the art should know that the present invention is not limited to detecting and suppressing busy signals, dial tones, ringback signals, offhook signals, DTMF signals, and periods of silence. Other embodiments of the present invention may have additional or fewer steps than described above.

From the above, it is apparent that the present invention provides, for use with analog telecommunications equipment that responds to in-band stimuli, a system for, and method of suppressing an in-band stimulus and a telecommunications infrastructure employing the system or the method. In one embodiment, the system includes: (1) a stimulus detector, associated with the analog telecommunications equipment, that detects a presence of the in-band stimulus and (2) a stimulus suppressor, coupled to the stimulus detector, that alters the in-band stimulus to cause the analog telecommunications equipment to disregard the in-band stimulus.

Although the present invention has been described in detail, those skilled in the art should understand that they can make various changes, substitutions and alterations herein without departing from the spirit and scope of the invention in its broadest form.

What is claimed is:

1. For use with analog telecommunications equipment that responds to in-band stimuli, a system for suppressing an in-band stimulus in the digital domain, comprising:
    a stimulus detector, associated with said analog telecommunications equipment, that detects a presence of said in-band stimulus base on a period of subthreshold amplitude variation; and
    a stimulus suppressor, coupled to said stimulus detector, that alters said in-band stimulus by increasing a subthreshold amplitude variation during a period to cause said analog telecommunications equipment to disregard said in-band stimulus.

2. The system as recited in claim 1 wherein said in-band stimulus is a dual tone multifrequency (DTMF) signal and said stimulus suppressor alters said in-band stimulus by altering a tone in said DTMF signal.

3. The system as recited in claim 1 wherein said stimulus suppressor increases said amplitude varistion during said period.

4. The system as recited in claim 1 wherein said in-band stimulus is selected from the group consisting of:
    a dial tone,
    a busy signal,
    a ringback signal, and
    an offhook signal.

5. The system as recited in claim 1 wherein said system is located in said analog telecommunications equipment.

6. The system as recited in claim 1 wherein said system is located in a conference bridge.

7. The system as recited in claim 1 wherein said system is embodied in a sequence of software instructions.

8. For use with analog telecommunications equipment that responds to in-band stimuli, a method of suppressing an in-band stimulus in the digital domain, comprising:
    detecting a presence of said in-band stimulus based on a subthreshold amplitude variation during a period; and
    altering said in-band stimulus to cause said analog telecommunications equipment to disregard said in-band stimulus.

9. The method as recited in claim 8 wherein said in-band stimulus is a dual tone multifrequency (DTMF) signal and said altering comprises altering a tone in said DTMF signal.

10. The method as recited in claim 8 wherein said altering comprises increasing said amplitude variation during said period.

11. The method as recited in claim 8 wherein said in-band stimulus is selected from the group consisting of:
    a dial tone,
    a busy signal,
    a ringback signal, and
    an offhook signal.

12. The method as recited in claim 8 wherein said method is carried out in said analog telecommunications equipment.

13. The method as recited in claim 8 wherein said method is carried out in a conference bridge.

14. The method as recited in claim 8 wherein said method is carried out by executing a sequence of software instructions.

15. A telecommunications infrastructure, comprising:
    a public switched telephone network (PSTN) having at least one switch and at least one conference bridge;
    analog telecommunications equipment, coupled to said PSTN, that responds to in-band stimuli; and
    a system for suppressing an in-band stimulus in the digital domain, including:
        a stimulus detector, associated with said PSTN, that detects a presence of said in-band stimulus, and
        a stimulus suppressor, coupled to said stimulus detector, that alters said in-band stimulus to cause said analog telecommunications equipment to disregard said in-band stimulus.

16. The infrastructure as recited in claim 15 wherein said in-band stimulus is a dual tone multifrequency (DTMF) signal and said stimulus suppressor alters said in-band stimulus by altering a tone in said DTMF signal.

17. The infrastructure as recited in claim 15 wherein said in-band stimulus is a period of subthreshold amplitude variation and said stimulus suppressor increases said amplitude variation during said period.

18. The infrastructure as recited in claim 15 wherein said in-band stimulus is selected from the group consisting of:
    a dial tone,
    a busy signal,
    a ringback signal, and
    an offhook signal.

19. The infrastructure as recited in claim 15 wherein said system is located in said switch.

20. The infrastructure as recited in claim 15 wherein said system is located in said conference bridge.

21. The infrastructure as recited in claim 15 wherein said system is embodied in a sequence of software instructions.

* * * * *